(12) United States Patent
Nakamoto

(10) Patent No.: US 10,970,017 B2
(45) Date of Patent: Apr. 6, 2021

(54) CONTROL METHOD FOR CONTROLLING AN IMAGE PROCESSING APPARATUS INCLUDING PRINTING AREAS DISPLAYED ON A DISPLAY UNIT AND PRINT INFORMATION FACING A PREDETERMINED DIRECTION

(71) Applicant: CANON KABUSHIKI KAISHA, Tokyo (JP)

(72) Inventor: Hiroshi Nakamoto, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/418,266

(22) Filed: May 21, 2019

(65) Prior Publication Data

US 2019/0361647 A1 Nov. 28, 2019

(30) Foreign Application Priority Data

May 23, 2018 (JP) .............................. JP2018-098777

(51) Int. Cl.
*G06F 3/12* (2006.01)

(52) U.S. Cl.
CPC .......... *G06F 3/1242* (2013.01); *G06F 3/1208* (2013.01)

(58) Field of Classification Search
CPC ...... G06F 3/1242; G06F 3/125; G06F 3/1253; G06F 3/1208; G06F 3/1285; H04N 1/00456; H04N 1/00408; H04N 1/0044
See application file for complete search history.

(56) References Cited

U.S. PATENT DOCUMENTS 10,011,387 B1* 7/2018 Payauys ............... G06Q 10/083

FOREIGN PATENT DOCUMENTS

JP 2014-023006 A 2/2014

* cited by examiner

*Primary Examiner* — Kent Yip
(74) *Attorney, Agent, or Firm* — Venable LLP

(57) ABSTRACT

A method of controlling an image processing apparatus includes displaying a plurality of areas including a center area having image data to be printed, and outer peripheral areas located in a perimeter of the center. These areas are zoned based on folding lines and/or cutoff lines. Print information is displayed in one of the plurality of outer peripheral areas. Another display step displays, when the predetermined operation is received, the print information on a target area among the plurality of the outer peripheral areas such that the print information, displayed on the target area, is facing a predetermined direction based on the target area. A processing step executes a process of printing the plurality of areas displayed on the display unit and the print information facing the predetermined direction, on the print medium to be processed by folding and/or cutting off the predetermined direction.

20 Claims, 10 Drawing Sheets

FIG. 8

| ADDITIONAL INFORMATION | PRIORITY |
|---|---|
| HEADER, FOOTER | SIDE SURFACE AREA > BACK SURFACE AREA |
| COPYRIGHT HOLDER | FRONT SURFACE AREA > SIDE SURFACE AREA |
| PHOTOGRAPHING INFORMATION, PRINT SETTING | BACK SURFACE AREA > SIDE SURFACE AREA |

CONTROL METHOD FOR CONTROLLING AN IMAGE PROCESSING APPARATUS INCLUDING PRINTING AREAS DISPLAYED ON A DISPLAY UNIT AND PRINT INFORMATION FACING A PREDETERMINED DIRECTION

This application claims the benefit of Japanese Patent Application No. 2018-098777, filed May 23, 2018, which is hereby incorporated by reference herein in its entirety.

BACKGROUND OF THE INVENTION

Field of the Invention

The present invention relates to a control method of controlling an image processing apparatus used to render an image.

Description of the Related Art

Occasions in which an image represented by image information is printed on a print medium, such as paper, to be exhibited, are increasing with the popularization of digital cameras and printers in recent years. In printing such a printed material for exhibition, additional print object information, such as copyright information, of image information is often printed along with an image represented by the image information. In Japanese Patent Application Laid-Open No. 2014-23006, there is disclosed a technology of placing a plurality of pieces of print object information in a printable area, and adjusting the degree of transparency of each piece of print object information when areas in which the pieces of print object information are printed overlap.

Measures to exhibit a processed print medium on which an image is printed are attracting attention. An exhibit that is prepared by a method called gallery wrap, for example, is normally prepared by folding outer peripheral portions of a print medium and attaching the folded portions to side and back surfaces of a wooden frame or a frame made of other materials. Consideration to the completed form of an exhibit is desirably paid when printing print object information of a print medium to be processed and displayed as an exhibit. In the case of a gallery wrap, for example, it is desired to print copyright information, or the like, inconspicuously in a folded area of the print medium, namely, an area to be attached to a side or back surface of the frame.

With the technology described in Japanese Patent Application Laid-Open No. 2014-23006, there is no consideration to the completed form of an exhibit, and print object information consequently fails to be appropriately printed in some cases. For instance, when an exhibit prepared by gallery wrap from a printed material that is printed by the technology of Japanese Patent Application Laid-Open No. 2014-23006 is viewed from the front, it may look as though print object information is cropped, because the print object information is printed on a fold line along which the print medium is folded.

SUMMARY OF THE INVENTION

The present invention has been made in view of the problem described above, and one of the objects of the present invention is, therefore, to provide a control method of controlling an image processing apparatus by which appropriate printing can be performed on a print medium to be processed after printing.

According to an exemplary embodiment, the present invention provides a control method of controlling an image processing apparatus, which is configured to generate print data for printing on a print medium to be processed by at least one of folding or cutting off, the control method including a zoning step of zoning the print data into a plurality of areas based on at least one of folding lines or cutoff lines, the plurality of areas including a center area in which a center of the print data is contained, and a plurality of outer peripheral areas located in a perimeter of the center area, a first locating step of locating image data that is a printing target in the center area, a second locating step of locating print information in one of the plurality of outer peripheral areas, and a control step of controlling, when the print information is located in one of the plurality of outer peripheral areas, a facing direction of the print information to be located, based on a position of the one of the plurality of outer peripheral areas in which the print information is to be located. In the control method, the facing direction of the print information to be located in one of the plurality of outer peripheral areas that is at a first position and the facing direction of the print information to be located in one of the plurality of outer peripheral areas that is at a second position are controlled to be different from each other.

According to the exemplary embodiment of the present invention, as the one of the objects, appropriate printing can be performed on the print medium to be processed after printing.

Further features of the present invention will become apparent from the following description of exemplary embodiments with reference to the attached drawings.

BRIEF DESCRIPTION OF THE DRAWINGS

FIG. 8 is a diagram for illustrating an example of priority information.

DESCRIPTION OF THE EMBODIMENTS

Now, embodiments of the present invention are described with reference to the attached drawings. Components that have the same functions are denoted by the same reference symbols throughout the drawings, and repetitive descriptions thereof may be omitted.

First Embodiment

An image processing apparatus to which the present invention is applied is described, as well as a printer to be connected to the image processing apparatus to which the present invention is applied. An example of the image processing apparatus that is described in a first embodiment of the present invention is a personal computer (hereafter abbreviated as "PC"). The image processing apparatus is not limited to a PC, and may be a mobile terminal, a smart phone, a notebook PC, a tablet terminal, a personal digital assistant (PDA), a digital camera, or various other apparatus. An inkjet printer capable of communication to and from the image processing apparatus is described in the first embodiment as an example of the printer to be connected to the image processing apparatus to which the present invention is applied. The printer to be connected to the image processing apparatus to which the present invention is applied may be a printer that is not an inkjet printer, for example, a full-color laser beam printer or a monochrome printer, or may be a copying apparatus, a facsimile apparatus, or a similar apparatus. The printers and apparatus may be multi-function apparatus or single-function apparatus.

Figure 1:
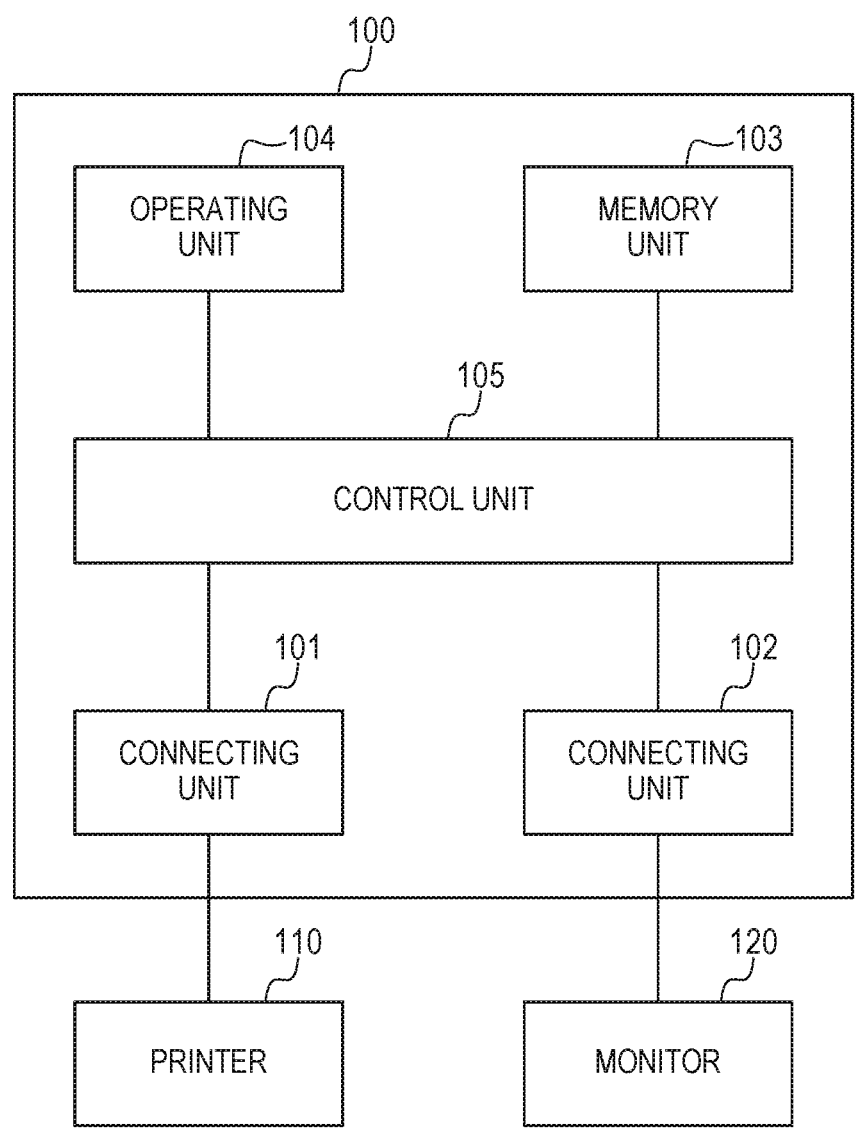
FIG. 1 is a diagram for illustrating a functional configuration of an image processing apparatus of a first embodiment of the present invention.

FIG. 1 is a diagram for illustrating a functional configuration of the image processing apparatus according to the first embodiment of the present invention. An image processing apparatus 100 illustrated in FIG. 1 is a host controlling a printer 110 and a monitor 120, and includes connecting units 101 and 102, a memory unit 103, an operating unit 104, and a control unit 105.

The connecting unit 101 is connected to the printer 110. The printer 110 is a printing apparatus that prints an image on a print medium (not shown) such as paper or cloth by following a print command from the image processing apparatus 100. The print command contains print data representing an image to be printed by the printer 110.

The connecting unit 102 is connected to the monitor 120. The monitor 120 is a display apparatus that displays an image by following a display command from the image processing apparatus 100. The display command contains display data representing an image to be displayed on the monitor 120.

The connection method used to connect the connecting unit 101 and the printer 110, and the connection method used to connect the connecting unit 102 and the monitor 120 are not particularly limited, and may be a wired connection method or a wireless connection method, for example. Communication between the connecting unit 101 and the printer 110 and between the connecting unit 102 and the monitor 120 may be held over the Internet or a similar communication network.

The memory unit 103 is a recording medium readable by a central processing unit (CPU) and other computers. The memory unit 103 includes a read-only memory (ROM), a random access memory (RAM), a hard disk, or the like.

The memory unit 103 records a program prescribing the operation of the computer. Examples of the program include an operating system (OS), drivers for controlling the printer 110 and the monitor 120, and various application programs. The application programs include an exhibition application used to print an image for exhibition, which is an image for a print medium to be processed for the purpose of exhibition. An exhibit in the first embodiment is prepared by, for example, gallery wrap in which a print medium is processed by folding outer peripheral portions of the print medium and attaching the folded portions to a wooden frame or a frame made of other materials.

The memory unit 103 also stores image information representing a photographed image and other images, and various types of setting information. The setting information is, for example, print setting information indicating print conditions under which the printer 110 prints an image. The print conditions are, for example, the sheet size indicating the size of a print medium, the type of the print medium, and an amount of extension by which the image extends beyond the confines of the print medium.

The operating unit 104 is operated by a user who uses the image processing apparatus 100, and receives various types of information input by the user. The operating unit 104 is, for example, a touch panel, a keyboard, or a mouse or a similar pointing device.

The control unit 105 includes a computer, e.g., a CPU, and reads a program stored in the memory unit 103 to generate image information that represents an image for exhibition in which print object information is placed in a printable area, where an image can be printed by the printer 110, by rendering the print object information in the printable area. Rendering print object information means generating image information that includes the print object information. The control unit 105 transmits a print command to print an image represented by the generated image information to the printer 110 via the connecting unit 101, thereby causing the printer 110 to print the image for exhibition.

Figure 2:
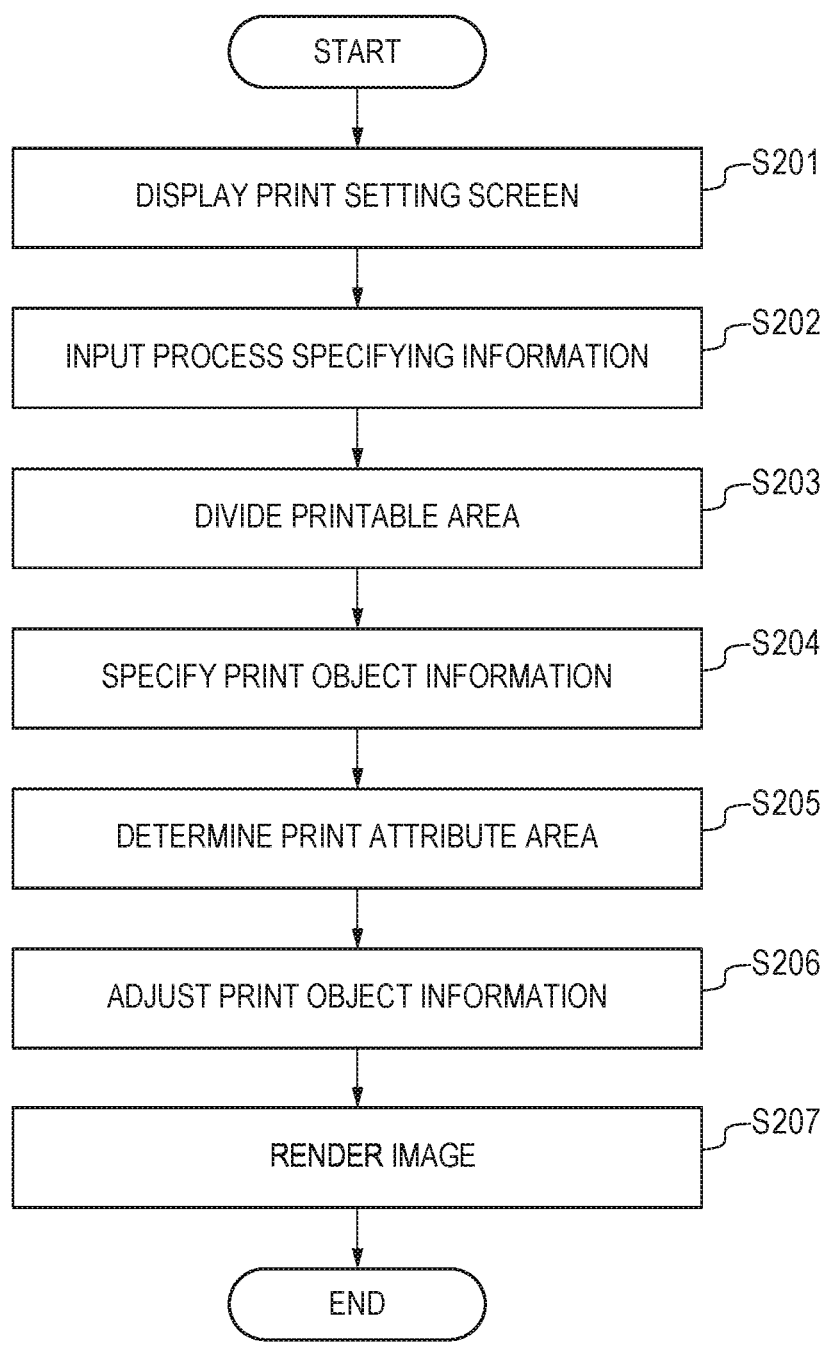
FIG. 2 is a flow chart for illustrating an example of the operation of the image processing apparatus in the first embodiment of the present invention.

The print object information in the first embodiment includes image information representing a photographed image and additional information about the image information. The additional information is, for example, photographing information and copyright information of the photographed image, description information depicting the photographed image, and print setting information. The additional information is text information, more specifically, a character string, but may be in the form of image information. FIG. 2 is a flow chart for illustrating a rendering operation that is executed in the image processing apparatus 100 to render an image for exhibition. The operation of this flow chart is implemented by the control unit 105 by running the exhibition application.

The control unit 105 first activates the exhibition application, and generates display data that represents a print setting screen for rendering and printing an image for exhibition as programmed by the exhibition application. The control unit 105 transmits a display command containing the display data to the monitor 120 via the connecting unit 102. The monitor 120 receives the display command, and displays the print setting screen by following the display command (Step S201).

Figure 3:
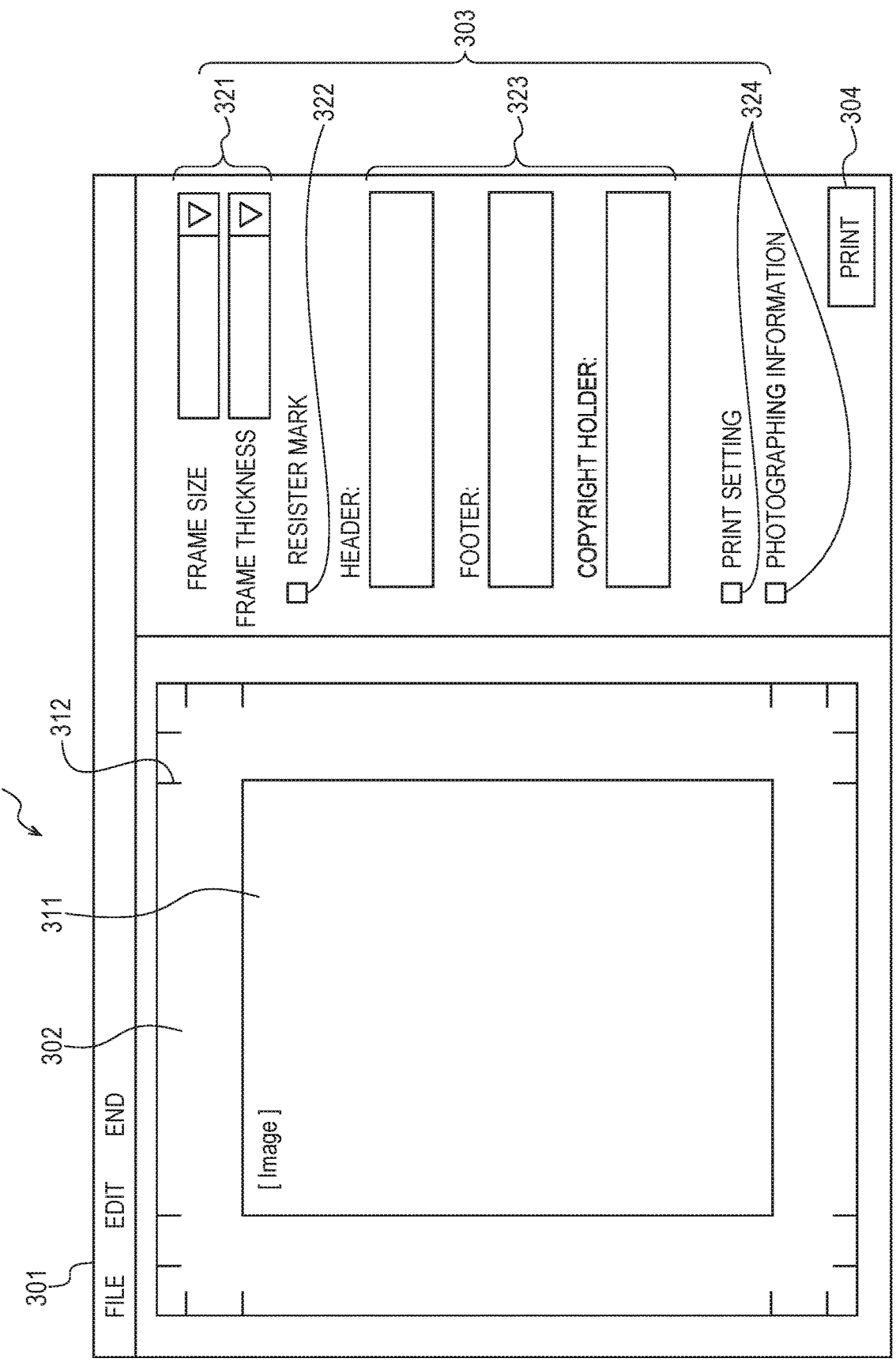
FIG. 3 is a diagram for illustrating an example of a print setting screen.

FIG. 3 is a diagram for illustrating an example of the print setting screen. A print setting screen 300 illustrated in FIG. 3 includes a menu bar 301, a page display area 302, a print setting menu 303, and a print button 304.

The menu bar 301 includes a menu for ending the application program, and for specifying and editing image information to be printed as print object information. While image information that represents an image to be printed is specified as print object information from among pieces of image information stored in the memory unit 103 in the first embodiment, different image information (for example, image information on a communication network or image information stored in external storage) may be specified.

The page display area 302 is an area in which an image for exhibition is displayed, and corresponds to the printable area in a print medium. An image rendering area 311, in which an image represented by image information is rendered, is displayed in the page display area 302, as well as register marks 312 indicating the positions of folding lines along which the print medium is folded and cutoff areas to be cut off from the print medium. The print setting menu 303 is a menu for inputting additional information, which is printed along with image information as print object information, and process specifying information, which indicates the specifics of processing of the print medium. The process specifying information is used as attribute specifying information for dividing the printable area into a plurality of attribute areas.

The print setting menu 303 includes pull-down menus 321, a checkbox 322, input fields 323, and check boxes 324.

The pull-down menus 321 are menus for selecting a frame size that is the size of a frame to which the print medium is to be attached, and the thickness of the frame. Frame size options are determined based on print setting information. For example, frame size options are determined based on the sheet size, and the type and amount of extension of the print medium. Frame thickness options are determined based on the frame size.

The check box 322 is a box for selecting whether to print the register marks 312. The positions of the register marks 312, namely, the positions of the folding lines of the print medium, are determined based on the frame size and the frame thickness. The frame size and the frame thickness are accordingly process specifying information.

The input fields 323 are fields in which a header, a footer, and a copyright holder's name are input. The header and the footer are description information about the photographed image. The header is printed in a part of the printable area that is above the image rendering area 311, and the footer is printed in a part of the printable area that is below the image rendering area 311. The copyright holder's name is an example of copyright information, and is printed inside the image rendering area 311. The check boxes 324 are boxes for selecting whether print setting information and photographing information are to be printed. The header, the footer, the copyright holder's name, the print setting information, and the photographing information are additional information.

The print button 304 is a button for issuing an instruction to execute printing based on the specifics that are displayed in the page display area 302.

The print object information rendered in the page display area 302 may be edited by selecting the rendered print object information with the use of the operating unit 104.

Returning to the description of the operation, when the print setting screen is displayed, the user uses the operating unit 104 to operate the print setting menu 303 and input process specifying information. The control unit 105 stores the input process specifying information in the memory unit 103 (Step S202). The control unit 105 determines the printable area based on the print setting information stored in the memory unit 103, and divides the printable area into a plurality of attribute areas based on the process specifying information stored in the memory unit 103 (Step S203).

Figure 4:
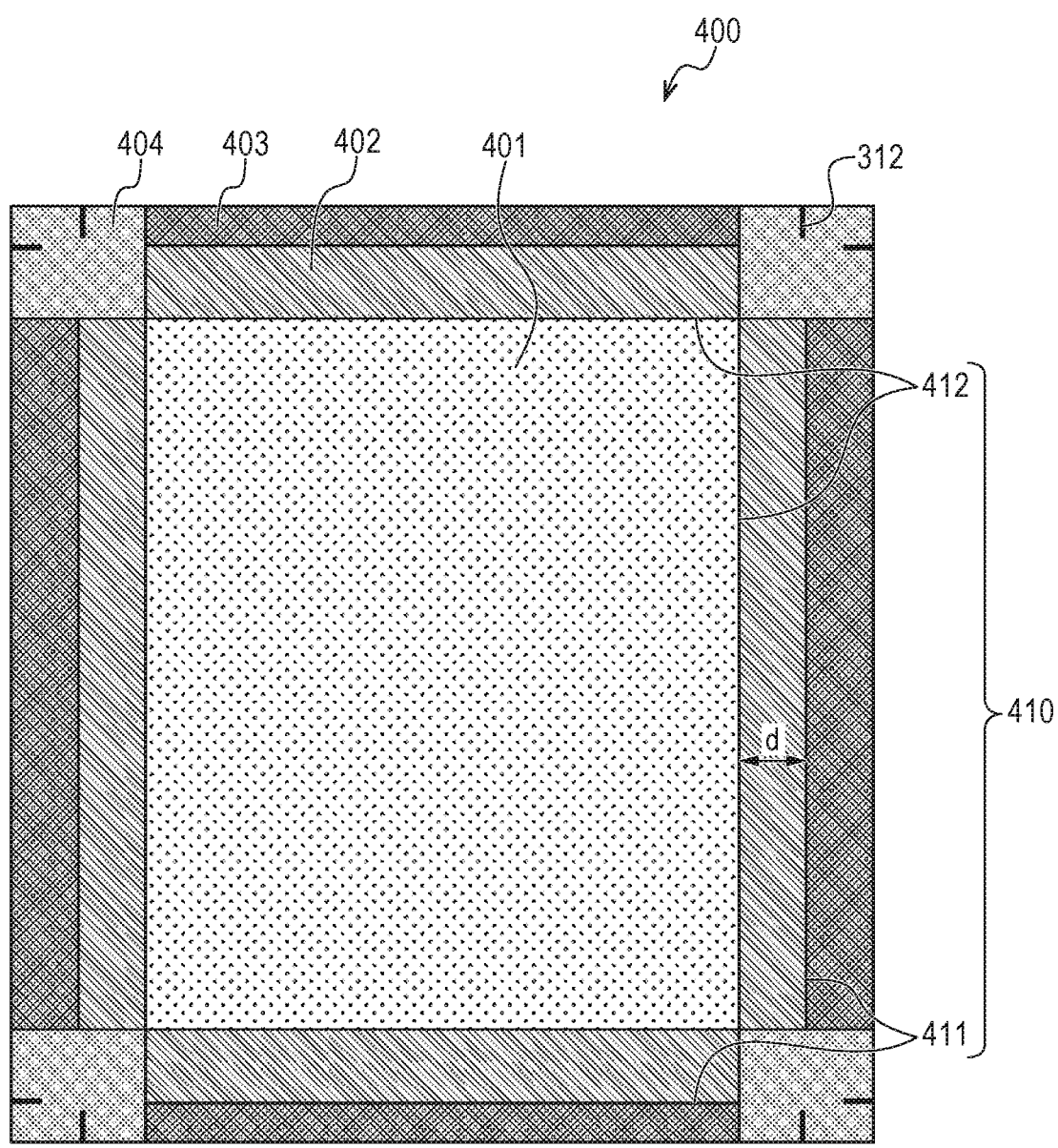
FIG. 4 is a diagram for illustrating an example of attribute areas.

FIG. 4 is a diagram for illustrating an example of the printable area and the attribute areas in a print medium. In FIG. 4, a printable area 400, the register marks 312 positioned based on the frame size and the frame thickness, which are the process specifying information, and print medium folding lines 410 having positions thereof determined by the register marks 312, are illustrated. The folding lines 410 include first lines 411 located in outer peripheral portions of the printable area 400 and second lines 412 located inside the first lines 411. In the illustrated example, the printable area 400 has a rectangular shape, and the first lines 411 and the second lines 412 run along the four sides of the printable area 400.

The printable area 400 is divided by the first lines 411 and the second lines 412 into four types of attribute areas: a front surface area 401, side surface areas 402, back surface areas 403, and cutoff areas 404.

The front surface area 401 is a first area inside the second lines 412. The front surface area 401 is positioned on the front surface of the frame when the print medium is attached to the frame. The size of the front surface area 401 is substantially equal to the frame size.

The side surface areas 402 are second areas between the first lines 411 and the second lines 412. The side surface areas 402 are positioned on the side surfaces of the frame when the print medium is attached to the frame. A distance "d" between the first lines 411 and the second lines 412 is substantially equal to the frame thickness.

The back surface areas 403 are third areas outside the first lines 411. The back surface areas 403 are folded areas of the print medium, and are positioned on the back surfaces of the frame.

The cutoff areas 404 are areas in the four corners of the printable area 400. More specifically, the cutoff areas 404 are each an area outside two second lines 412 that intersect with each other in one of the four corners of the printable area 400. The cutoff areas 404 are cut off from the print medium when the print medium is attached to the frame. Returning to the description of the operation, the user uses the operating unit 104 to specify print object information to be printed. Specifically, the user uses the operating unit 104 to specify image information on the menu bar 301, or to specify additional information from the print setting menu 303 (Step S204).

The control unit 105 determines a print area in which the specified print object information is to be printed. The control unit 105 in the first embodiment determines, as the print area, a print attribute area, which is an attribute area for printing print object information, out of the attribute areas based on the attribute (type) of the specified print object information (Step S205).

For instance, association information indicating an association relation between the attribute of a piece of print object information and a print attribute area is stored in the memory unit 103 in advance, and the control unit 105 uses the association information to determine a print attribute area that is associated with the attribute of the specified print object information.

The attribute of a piece of print object information in the first embodiment means one of "image information", "header", "footer", "copyright information (copyright holder's name)", "print setting information", and "photographing information". The control unit 105 determines the front surface area as the print attribute area when the specified print object information is image information or copyright information. The control unit 105 determines one of the side surface areas as the print attribute area when the specified print object information is a header or a footer, and determines one of the back surface areas as the print attribute area when the specified print object information is print setting information or photographing information. Once the print attribute area is determined, the control unit 105 controls the rendering of the print object information in a manner suited to the determined print attribute area (Steps S206 and S207). Examples of the rendering control include the rotation, enlargement/reduction, relocation, and splitting of the print object information.

The control unit 105 in the first embodiment adjusts the size and facing direction of the print object information first in Step S206 by enlarging/reducing and rotating the print object information depending on the print attribute area.

Specifically, when the print attribute area of the print object information is one of the side surface areas, the control unit 105 reduces the print object information to fit in the side surface area. When the print attribute area of the print object information is one of the back surface areas, the control unit 105 reduces the print object information to fit in the back surface area, and also rotates the print object information so that the print object information faces a predetermined direction. The predetermined direction is a direction in which the print object information faces upward when the exhibit with the print medium attached to the frame is viewed from the back. When the print attribute area of the print object information is the front surface area, the control unit 105 executes none of the enlargement/reduction and rotation of the print object information.

In Step S207, the control unit 105 generates an image for exhibition by rendering, in the print attribute area, the print object information having the size and facing direction thereof adjusted. The control unit 105 transmits a display command to display the print setting screen including the image for exhibition to the monitor 120 via the connecting unit 102. The monitor 120 receives the display command, and displays the print setting screen including the image for exhibition by following the display command.

Steps S204 to S207 are subsequently repeated each time a piece of print object information is specified, and, when the printing of an image for exhibition is instructed with the press of the print button 304 illustrated in FIG. 3 or by other measures, the control unit 105 generates print data representing the image for exhibition. The control unit 105 generates a print command containing the print data, and transmits the print command containing the print data to the printer 110 via the connecting unit 101, thereby causing the printer 110 to print the image for exhibition on a print medium.

Figure 5:
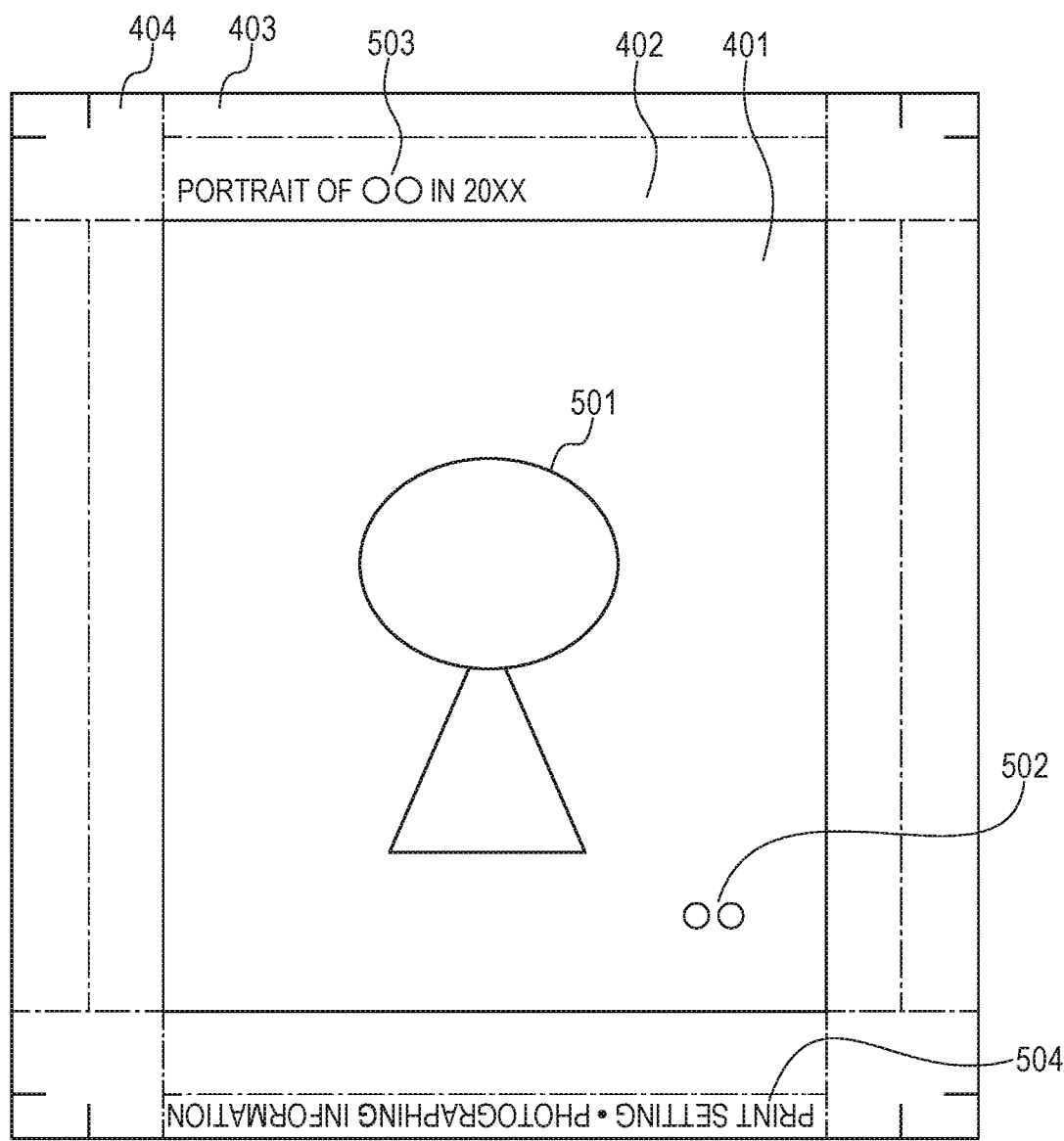
FIG. 5 is a diagram for illustrating an example of an image for exhibition.
Figure 6A:
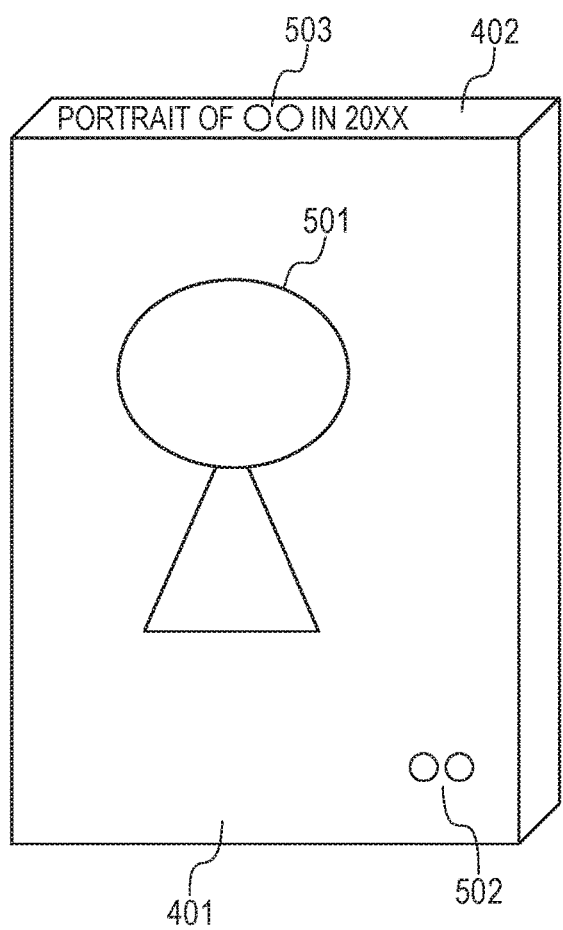
FIG. 6A and FIG. 6B are diagrams for illustrating an example of an exhibit.
Figure 6B:
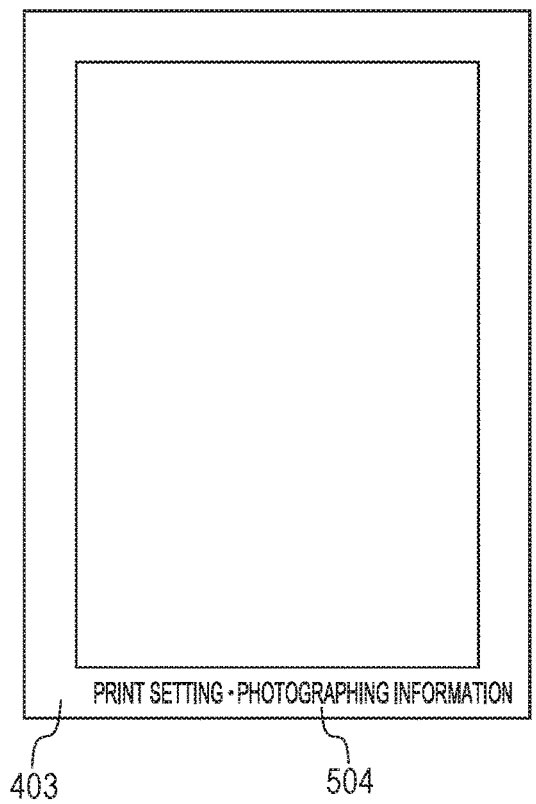

FIG. 5 is a diagram for illustrating an example of the image for exhibition rendered in Step S207. FIG. 6A and FIG. 6B are diagrams for illustrating an example in which the image for exhibition illustrated in FIG. 5 is attached to a frame to be prepared as an exhibit. FIG. 6A is a perspective view for illustrating the front and side surfaces of the exhibit, and FIG. 6B is a plan view for illustrating the back surface of the exhibit.

In the example of FIG. 5, FIG. 6A, and FIG. 6B, image information 501 and copyright information 502, which is "∘∘", are placed in the front surface area 401, and a header 503, which is "a portrait of ∘∘ in year 20xx", is placed in one of the side surface areas 402. Condition information 504, which is a combination of print setting information and photographing information, is placed in one of the back surface areas 403. No footer is specified.

The header 503 has been adjusted in size to fit in the side surface area 402, and accordingly does not extend to the front and back surfaces of the completed exhibit illustrated in FIG. 6A and FIG. 6B. The header 503 is consequently prevented from appearing to be cropped irrespective of whether the exhibit is viewed from the front or from the side. The condition information 504 is placed in one of the back surface areas 403 that is below the front surface area 401 as illustrated in FIG. 5. The condition information 504 is upside down because the back surface areas 403 are folded toward the back surfaces of the frame in the exhibit illustrated in FIG. 6A and FIG. 6B. The condition information 504 is accordingly rotated by 180° to face downward in the state of FIG. 5. The condition information 504 consequently faces upward in the exhibit illustrated in FIG. 6A and FIG. 6B.

As described above, according to the first embodiment, the memory unit 103 stores the process specifying information, which indicates the specifics of a process performed on a print medium. The control unit 105 divides the printable area in which print object information can be printed into a plurality of attribute areas based on the process specifying information. The control unit 105 determines one of the plurality of attribute areas as a print attribute area in which print object information is to be printed, and controls the rendering of the print object information in a manner suited to the determined print attribute area.

Consequently, the printable area is divided into a plurality of attribute areas based on the process specifying information, which indicates the specifics of a process performed on a print medium, and the rendering of the print object information is controlled in a manner suited to one of the plurality of attribute areas that is determined as the print attribute area in which the print object information is to be printed. Consideration to the completed form of an exhibit prepared by processing the print medium can thus be paid in the printing of the print object information, and appropriate printing is accomplished even when the print medium is to be processed. According to the first embodiment, when the determined print attribute area is one of the side surface areas, the control unit 105 enlarges/reduces print object information to fit in the side surface area. As a result, the print object information is prevented from extending to other surfaces even when the print object information is printed in a narrow area such as a side surface of an exhibit prepared by gallery wrap. The print object information can accordingly be prevented from appearing to be cropped.

According to the first embodiment, when the determined print attribute area is one of the back surface areas, the control unit 105 enlarges/reduces print object information to fit in the back surface area, and rotates the print object information so that the print object information faces the predetermined direction. As a result, the print object information is prevented from extending to other surfaces, and the printing of a print object image can be performed in an appropriate facing direction even when the facing direction of the print object information is changed by processing the print medium, as is the case for the back surface of an exhibit prepared by gallery wrap.

Second Embodiment

A second embodiment of the present invention differs from the first embodiment in that an encoding code is used instead of text information as at least part of the additional information. The encoding code is information that is generated by encoding original information, which is a character string, or the like, into a given pattern, for example, a bar code or a two-dimensional code. In order for a user to recognize original information of an encoding code, it is required to read the encoding code by scanning or photographing with the use of a given input device, e.g., a camera or a scanner, and to decode the read encoding code. There may be conditions for normally decoding an encoding code with respect to the size and facing direction of the encoding code, and the conditions are required to be taken into consideration when the encoding code is rendered.

Figure 7:
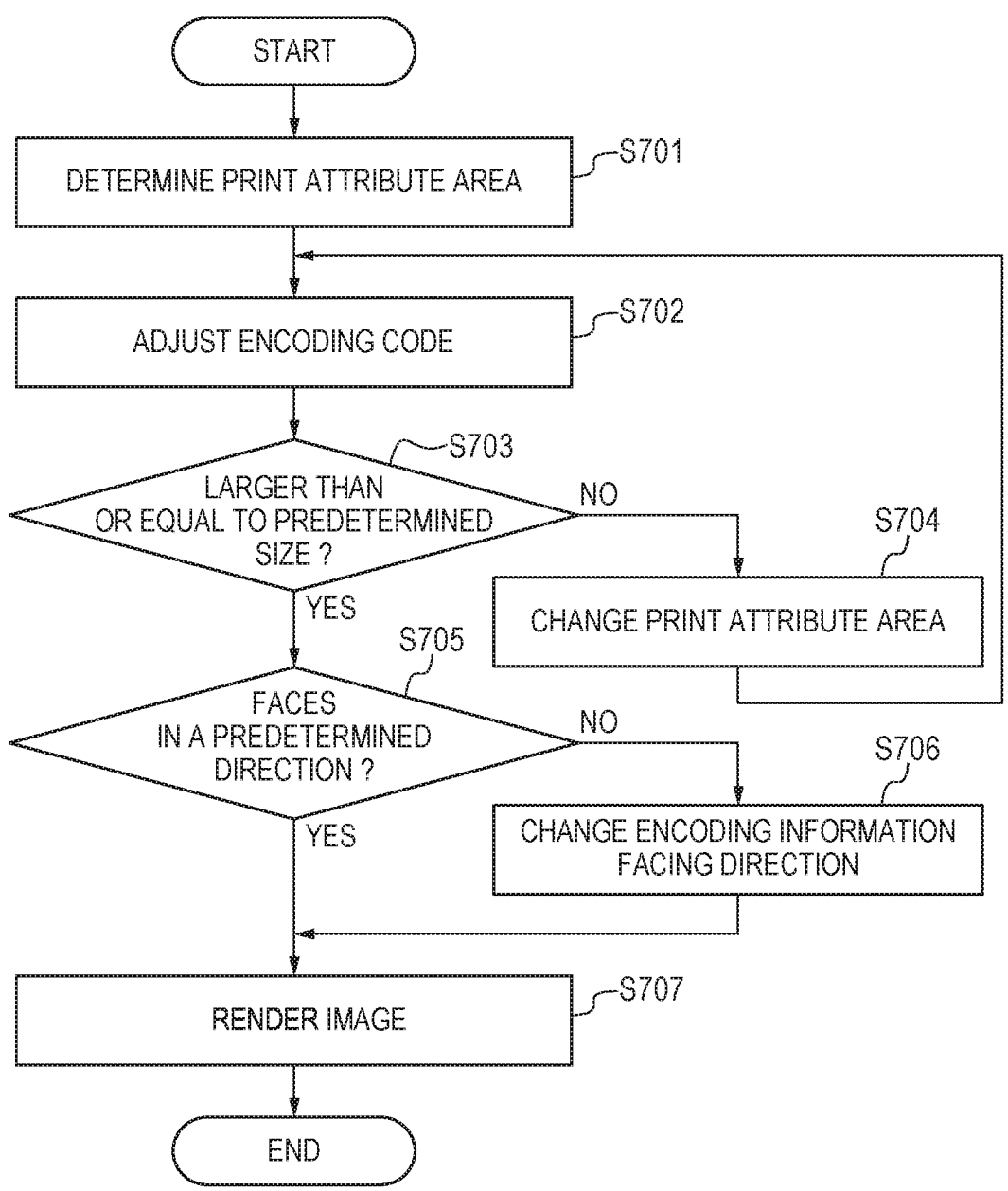
FIG. 7 is a flow chart for illustrating an example of the operation of an image processing apparatus in a second embodiment of the present invention.

FIG. 7 is a flow chart for illustrating a rendering operation that is executed in the second embodiment to render an image for exhibition. The operation of this flow chart is implemented by the control unit 105 by running the exhibition application.

In the second embodiment, Steps S201 to S204 described with reference to FIG. 2 are executed first. The control unit 105 then determines whether the print object information specified in Step S204 is an encoding code. When the specified print object information is not an encoding code, Steps S205 to S207 described with reference to FIG. 2 are executed. When the specified print object information is an encoding code, on the other hand, the control unit 105 executes Step S701 of FIG. 7.

Specifically, the control unit 105 determines one of the attribute areas as the print attribute area based on the attribute of the encoding code (Step S701). In the second embodiment, priority information indicating the priority of an attribute area that is determined as a print attribute area is stored for each attribute of print object information in the memory unit 103 in advance, and the control unit 105 uses the priority information to determine a print attribute area associated with the attribute of the specified print object information. Here, the control unit 105 determiners an attribute area that has the highest priority as the print attribute area.

FIG. 8 is a diagram for illustrating an example of the priority information. Priority information 800 illustrated in FIG. 8 indicates a priority 802 of additional information 801. The priority 802 in FIG. 8 indicates that an attribute area on the left-hand side of the inequality sign (>) is an area having a higher priority.

Returning to the description of the operation, the control unit 105 controls the size and facing direction of the encoding code by enlarging/reducing and rotating the encoding code depending on the print attribute area (Step S702). The specific method of adjusting the encoding code is the same as the adjustment method in the first embodiment.

The control unit 105 determines whether the size of the adjusted encoding code is larger than or equal to a predetermined size (Step S703). The predetermined size is equal to or larger than a minimum size at which the encoding code can be decoded.

When the size of the encoding code is smaller than the predetermined size, the control unit 105 changes the print attribute area in which the encoding code is to be printed to another attribute area (Step S704), and then returns to Step S702. In Step S704, the control unit 105 determines an attribute area that has the second highest priority after the current print attribute area in the priority information stored in the memory unit 103 as a new print attribute area. In this manner, the control unit 105 keeps changing the print attribute area in descending order of priority of the attribute areas based on the priority information until the size of the encoding code becomes equal to or larger than the predetermined size. When an attribute area having the lowest priority is determined as the print attribute area and it is determined that the size of the encoding code is smaller than the predetermined size, the control unit 105 ends the processing. The user may be notified of this by, for example, an error message displayed on the monitor 120 and saying that the specified encoding code cannot be used.

When the size of the encoding code is equal to or larger than the predetermined size, on the other hand, the control unit 105 determines whether the encoding code is facing a predetermined direction (Step S705). The predetermined direction is a direction in which the encoding code can be decoded in the form of an exhibit that is prepared by attaching the print medium to a frame.

When the encoding code is not facing the predetermined direction, the control unit 105 rotates the encoding code so that the encoding code faces the predetermined direction (Step S706).

When the encoding code is facing the predetermined direction in Step S705, and when the facing direction of the encoding code is changed in Step S706, an image for exhibition is generated by rendering the encoding code in the print attribute area. The control unit 105 transmits a display command to display the print setting screen including the image for exhibition to the monitor 120 via the connecting unit 102. The monitor 120 receives the display command, and displays the print setting screen including the image for exhibition by following the display command (Step S707).

Figure 9:
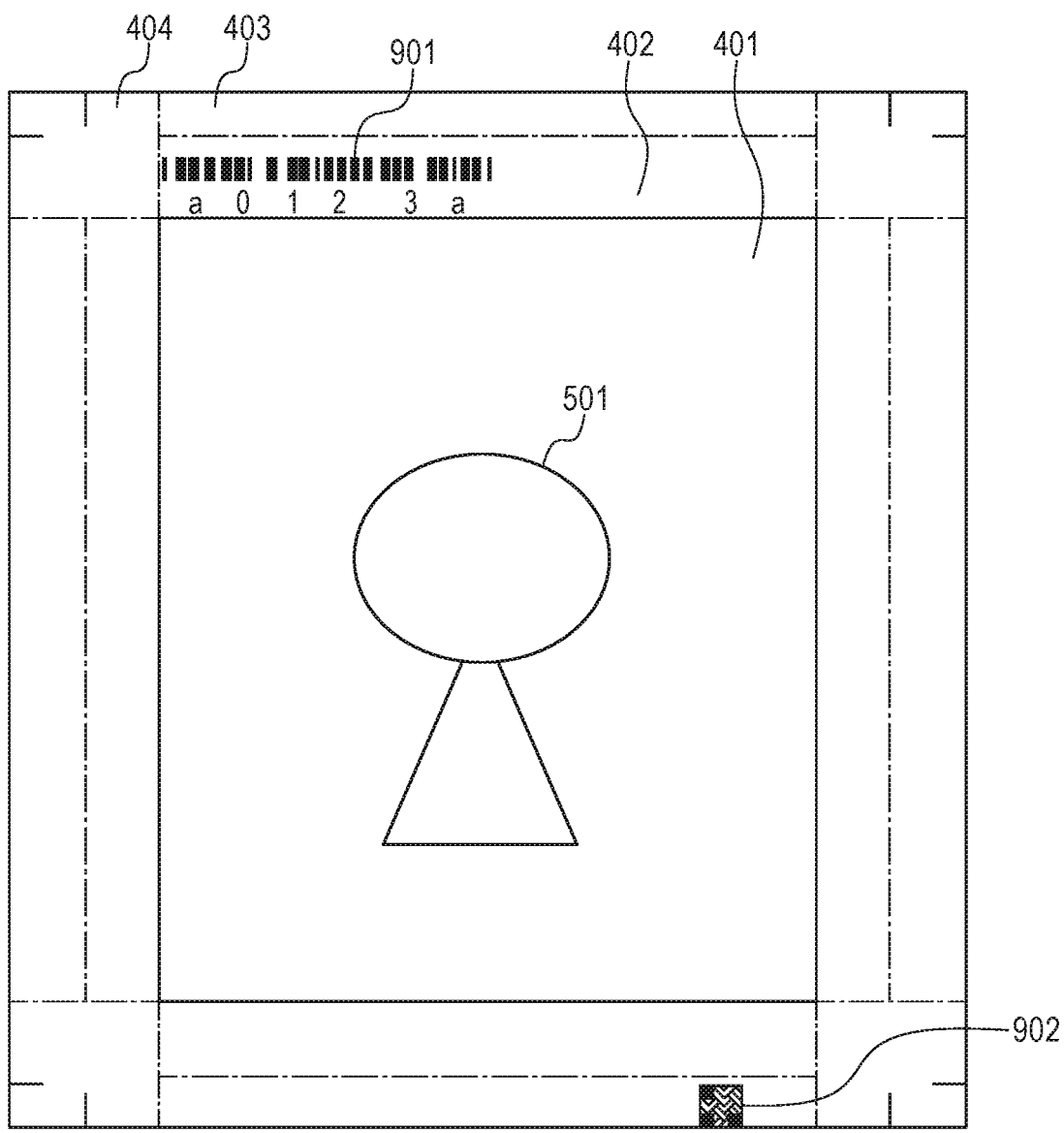
FIG. 9 is a diagram for illustrating another example of the image for exhibition.

FIG. 9 is a diagram for illustrating an example of the image for exhibition rendered in Step S707. In FIG. 9, a bar code 901, which is an encoding code, is rendered as a header, and a two-dimensional code 902, which is an encoding code, is rendered as the condition information. The two-dimensional code 902 is rendered in one of the back surface areas 403 to be folded in the completed form of the exhibit, and is accordingly rendered upside down.

In the second embodiment, the same processing as in the first embodiment is executed when the specified additional information is text information. However, the processing of the second embodiment may be executed for text information as well, because too small text information is hard to visually recognize.

According to the second embodiment, the control unit 105 changes the print attribute area to another attribute area when the size of the reduced print object information is smaller than the predetermined size. As a result, it is possible to prevent a situation in which information that is required to have a certain size to be recognized, e.g., an encoding code, is reduced to a size too small to be recognized.

According to the second embodiment, the control unit 105 keeps changing the print attribute area in descending order of priority of the attribute areas based on the priority information, until the size of the specified print object information becomes equal to or larger than the predetermined size. The print object information can accordingly be printed in an appropriate print attribute area.

Third Embodiment

In the first embodiment, one of a plurality of attribute areas is selected as a print object area, which is a print area where print object information is to be printed. In a third embodiment of the present invention, the determination of the print area is not based on the attribute areas, and is based on the attribute of print object information. The print area may consequently overlap with a plurality of attribute areas, or may overlap partially or entirely with a cutoff area.

When the print area overlaps with a plurality of attribute areas, or overlaps partially or entirely with a cutoff area, the control unit 105 adjusts the print object information (print area) to fit in a single attribute area.

In the third embodiment, Steps S201 to S204 described with reference to FIG. 2 are executed first. The control unit 105 then determines the print area based on the attribute of the specified print object information. In the third embodiment, too, the operation illustrated in the flow chart of FIG. 2 is implemented by the control unit 105 by running the exhibition application.

The control unit 105 subsequently determines whether the print area fits in a single attribute area. When the print area is contained in a single attribute area, the control unit 105 determines this attribute area as the print attribute area, and executes Steps S206 and S207 described with reference to FIG. 2.

When the print area does not fit in a single attribute area, that is, when the print area overlaps with a plurality of attribute areas, the control unit 105 adjusts the specified print object information to fit in a single attribute area. Specifically, the control unit 105 relocates or reduces the specified print object information to fit in a single attribute area, and determines the single attribute area as the print attribute area. The control unit 105 then executes Steps S206 and S207 described with reference to FIG. 2.

When the print area overlaps with a plurality of attribute areas, the control unit 105 may split the specified print object information into pieces, and adjust each of the pieces of print object information obtained by the splitting to fit in a single attribute area. For example, the control unit 105 first splits the specified print object information into a first portion, which fits in one of the plurality of attribute areas overlapping with the print area, and a second portion, which is the rest. The control unit 105 subsequently relocates the second portion to another attribute area, while keeping the first portion in the attribute area. In the splitting of the print object information, the cutting line, along which the print object information is split, is desirably determined by taking into consideration each of pieces of print object information that are to be obtained by the splitting. For example, the condition information, which is a combination of print setting information and photographing information, is desirably split into the print setting information and the photographing information. Whether to split the specified print object information may be determined based on the attribute of the print object information, or every piece of print object information may be split. For example, the control unit 105 may split the specified print object information when the attribute of the print object information is "condition information", whereas the print object information having the attribute other than "condition information" may not be split and may be relocated or reduced to fit in a single attribute area.

Figure 10A:
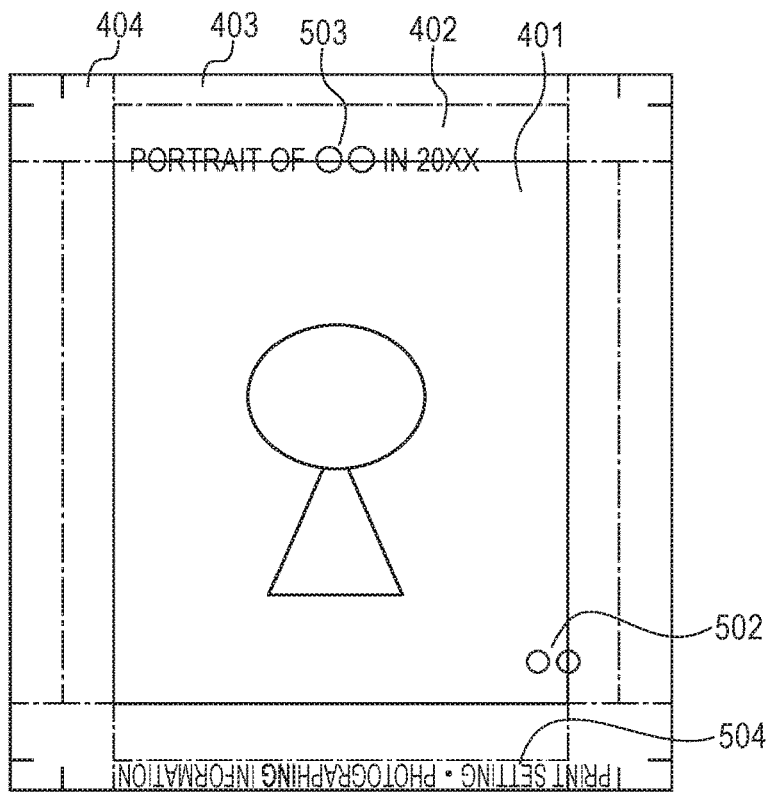
FIG. 10A and FIG. 10B are diagrams for illustrating an example of the operation of an image processing apparatus in a third embodiment of the present invention.
Figure 10B:
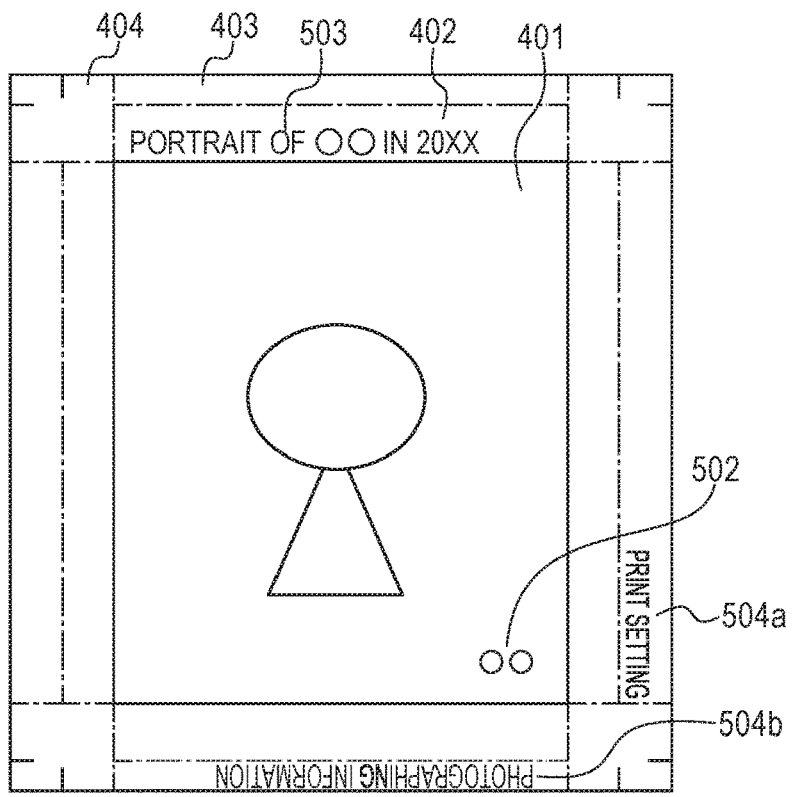

FIG. 10A and FIG. 10B are diagrams for illustrating a rendering operation in the third embodiment, in which an image for exhibition is rendered. An image for exhibition prior to the adjustment of the print object information is illustrated in FIG. 10A, and the exhibition image, after the print area is changed, is illustrated in FIG. 10B.

In FIG. 10A, the copyright information 502 and the header 503 each overlap with one of the side surface areas 402 and the front surface area 401, and the condition information 504 overlaps with one of the back surface areas 403, and one of the cutoff areas 404 that are below the front surface area 401. In FIG. 10B, the copyright information 502 is relocated to fit in the front surface area 401, and the header 503 is relocated to fit in the side surface area 402. The condition information 504 in FIG. 6B is split into print setting information 504*a* and photographing information 504*b*. The print setting information 504*a* is relocated to fit in one of the back surface areas 403 that is beside the front surface area 401, and the photographing information 504*b* remains in the one of the back surface areas 403 that is below the front surface area 401.

As described above, according to the third embodiment, the control unit 105 controls the rendering of print object information to be printed in a print area that fits in a single attribute area with the single attribute area set as the print attribute area. When the print area overlaps with a plurality of attribute areas, the control unit 105 adjusts the print object information to fit in a single attribute area, and then controls the rendering of print object information with the single attribute area set as the print attribute area.

Print object information can thus be adjusted to fit in a single attribute area even when the print area in which the print object information is to be printed overlaps with a plurality of attribute areas. Appropriate printing is accordingly accomplished even when the print medium is to be processed.

Other Embodiments

In each embodiment described above, the illustrated configuration is merely an example, and the present invention is not limited to the configuration.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control method for controlling an image processing apparatus, the control method comprising:
    a first displaying step of causing a display unit to display a plurality of areas including a center area where an image data to be printed is located, and a plurality of outer peripheral areas located in a perimeter of the center area, wherein the plurality of areas are zoned based on at least one of folding lines and cutoff lines;
    a receiving step of receiving a predetermined operation to cause the display unit to display print information in one of the plurality of outer peripheral areas;
    a second displaying step of displaying, when the predetermined operation is received, the print information on a target area among the plurality of the outer peripheral areas such that the print information, displayed on the target area, is facing a predetermined direction based on the target area; and a processing step of executing a process for printing the plurality of areas displayed on the display unit and the print information facing the predetermined direction, on the print medium to be processed by at least one of folding and cutting off, wherein the predetermined direction based on an outer peripheral area that is at a first position among the plurality of the outer peripheral areas and the predetermined direction based on an outer peripheral area that is at a second position among the plurality of the outer peripheral areas are controlled to be different from each other.

2. The control method according to claim 1, wherein the print information is resized to fit in the target area.

3. The control method according to claim 1, further comprising a step of changing the target area to another target area among the plurality of the outer peripheral areas, the other target area being other than the target area, when the print information located in the target area has a size smaller than a predetermined size, wherein, when the print information located in the target area has a size equal to or larger than the predetermined size, the print information is located in the target area.

4. The control method according to claim 3, wherein the step of changing is executed in a case that the print information is an encoding code, but is not executed in a case that the print information is text information.

5. The control method according to claim 1, wherein, when the print information of a first type and the print information of a second type both fail to fit in the target area, the print information of the first type is located to fit in the target area, and the print information of the second type is located to fit in another target area among the plurality of outer peripheral areas, the other target area being other than the target area.

6. The control method according to claim 5, wherein the print information of the first type is information about photographing information of the image data, and wherein the print information of the second type is information about print setting information of the image data.

7. The control method according to claim 1, wherein the plurality of outer peripheral areas includes an area that is in a perimeter of the center area and is above the center area, and includes an area that is in a perimeter of the center area and is below the center area, and wherein the predetermined direction based on the area that is in a perimeter of the center area and is above the center area, is an upward direction and the predetermined direction based on the area that is in a perimeter of the center area and is below the center area, is a downward direction.

8. The control method according to claim 1, wherein the print information is at least one of text information or an encoding code.

9. The control method according to claim 1, further comprising a setting step of setting, when receiving the predetermined operation, one of the plurality of outer peripheral areas to the target area based on a kind of the print information displayed in accordance with the predetermined operation.

10. The control method according to claim 9, wherein, when the kind of the print information displayed in accordance with the predetermined operation is header information of the print information, an area that is in a perimeter of the center area and is above the center area is set to the target area, and, when the kind of the print information displayed in accordance with the predetermined operation is at least one of information about photographing information of the image data and information about print setting information of the image data, an area that is in a perimeter of the center area and is below the center area is set to the target area.

11. A control method for controlling an image processing apparatus, the control method comprising:

a first displaying step of causing a display unit to display a plurality of areas that are zoned based on at least one of folding lines and cutoff lines; and a receiving step of receiving a predetermined operation to cause the display unit to display print information in one of the plurality of areas;

a second displaying step of displaying, when the predetermined operation is received, the print information on a target area among the plurality of the areas such that the print information, displayed on the target area, is facing a direction based on a type of the print information; and a processing step of executing a process for printing the plurality of areas displayed on the display unit and the print information facing the predetermined direction, on the print medium to be processed by at least one of folding and cutting off, wherein the predetermined direction based on a first type of the print information and the predetermined direction based on a second type of the print information are controlled to be different from each other.

12. The control method according to claim 11, wherein the print information is resized to fit in the target area.

13. The control method according to claim 11, further comprising a step of changing the target area to another target area among the plurality of areas, the other target area being other than the target area, when the print information located in the target area has a size smaller than a predetermined size, wherein, when the print information located in the target area has a size equal to or larger than a predetermined size, the print information is located in the target area.

14. The control method according to claim 13, wherein the step of changing is executed in a case that the print information is an encoding code, but is not executed in a case that the print information is text information.

15. The control method according to claim 11, wherein, when the print information of a predetermined type and the print information of a particular type both fail to fit in the target area, the print information of the predetermined type is located to fit in the target area, and the print information of the particular type is located to fit in another target area among the plurality of areas and other than the target area.

16. The control method according to claim 11, wherein the predetermined direction based on the first type is an upward direction, and the predetermined direction based on the second type is a downward direction.

17. The control method according to claim 11, wherein the plurality of areas include a center area in which image data that is a printing target is to be located, wherein the print information includes header information of the image data, and at least one of information about photographing information of the image data and information about print setting information of the image data.

18. The control method according to claim 11, wherein the print information is at least one of text information or an encoding code.

19. The control method according to claim 11, further comprising a setting step of setting, when receiving the predetermined operation, one of the plurality of the areas to the target area based on a kind of the print information displayed in accordance with the predetermined operation.

20. The control method according to claim 19, wherein, when the kind of the print information displayed in accordance with the predetermined operation is header information of the print information, an area that is in a perimeter of a center area in the plurality of the areas and is above the center area is set to the target area, and, when the kind of the print information displayed in accordance with the predetermined operation is at least one of information about photographing information of the image data and information about print setting information of the image data, an area that is in a perimeter of the center area and is below the center area is set to the target area.

* * * * *